United States Patent [19]
Grimm et al.

[11] Patent Number: 4,758,410
[45] Date of Patent: Jul. 19, 1988

[54] CARTRIDGE FOR CATALYST PLATES

[75] Inventors: Daniel Grimm, Schlangenbad-Bärstadt; Klaus Heil, Wiesbaden-Naurod; Hartmut Kainer, Wiesbaden; Hermann Stein, Bad Dürkheim, all of Fed. Rep. of Germany

[73] Assignee: Didier-Werke AG, Wiesbaden, Fed. Rep. of Germany

[21] Appl. No.: 905,689

[22] Filed: Sep. 9, 1986

[30] Foreign Application Priority Data

Sep. 12, 1985 [DE] Fed. Rep. of Germany ....... 3532577

[51] Int. Cl.$^4$ .......................... B01D 53/36; F01N 3/10
[52] U.S. Cl. ................................. 422/311; 422/171; 422/179
[58] Field of Search ............... 422/311, 179, 221, 171, 422/180

[56] References Cited
U.S. PATENT DOCUMENTS 2,590,293  3/1952  Armstrong ...................... 422/311 X
3,916,057 10/1975  Hatch et al. .............. 106/DIG. 3 X
3,969,083  7/1976  Givens et al. .................... 422/179 X Primary Examiner—Barry S. Richman
Assistant Examiner—Jill Johnston
Attorney, Agent, or Firm—Nils H. Ljungman

[57] ABSTRACT

The invention relates to a cartridge to hold catalyst plates, which plates are spaced apart, thereby leaving open slot-shaped channels for the passage of fluids to be cleaned catalytically by the plates. The cartridge is shaped in a parallelepiped or an essentially cubic form. There are recesses which form mountings for the insertion of the catalyst plates on at least two sides facing one another. The recesses are groove-like, into which the edges of the catalyst plates fit. For the simplest possible and most solid fastening of the catalyst plates in the cartridge, the mountings comprise a metal wire mesh as the static element, which is coated with a coating containing vermiculite or a similar material which expands when heated. Zeolite may also be used as the coating material.

14 Claims, 3 Drawing Sheets

CARTRIDGE FOR CATALYST PLATES

BACKGROUND OF THE INVENTION

1. Field of the Invention:

The invention relates to a cartridge to hold catalyst plates, and more particularly, to a cartridge with slots to hold catalyst plates.

The cartridge, when assembled, has slot-shaped channels between the plates which are open to permit the passage of fluids which are to be cleaned catalytically, preferably gases therebetween. The cartridges have an essentially cubic frame which can be stacked with other similar frames. The cartridges preferably have mountings to hold catalyst plates on at least two sides opposite one another, whereby the mountings exhibit groove-like recesses, into which the edges of the catalyst plates fit.

2. Description of the Prior Art:

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal."

Methods of forming the moldings of the present invention are well known in the prior art. Some recently published examples are found in U.S. Pat. No. 4,495,118, entitled "Ceramic Plates and Method For The Production Thereof"; U.S. Pat. No. 4,183,885, entitled "Quick Baking Process for Ceramic Products"; U.S. Pat. No. 4,092,092, entitled "Apparatus for Making Ceramic Articles"; U.S. Pat. No. 3,965,246, entitled "Process for the Production of Ammonia Using Aligned Catalyst Particles"; and U.S. Pat. No. 3,881,696, entitled "Catalyst for Cleaning Engine Exhaust Gases". All of the above-cited patents are incorporated by reference as if the entire contents thereof were fully set forth herein.

OBJECTS OF THE INVENTION

An object of the present invention is to provide a simple and solid cartridge.

Another object of the present invention is to provide a solid but nevertheless elastic cartridge.

Yet another object of the present invention is to provide a fastening for catalyst plates in the cartridge.

SUMMARY OF THE INVENTION

These objects are essentially achieved in that the mountings comprising a metal wire mesh as a static element, which is coated with a coating containing at least vermiculite or a similar material which expands when heated. The term "metal wire mesh" as used here is understood to include all flat structures comprising metal wire, whether woven or knitted, etc. The same effect can be achieved, however, by perforated plates, rib mesh, etc., made of appropriately thin material, which can assure a firm and permanent base for the coating because of projections and/or passages. Such metal wire meshes can be easily formed and molded into the desired shape with groove-like recesses, into which the edges of the catalyst plates can be inserted, and the meshes can be coated with the desired coating. The vermiculite or similarly expandable material specified as a component of the coating begins to expand at approximately 200° C., and thereby firmly braces the catalyst plates inserted in the mountings in their guide grooves. The bracing forces can also be determined by the proportion of vermiculite or similar material in the coating. The catalyst plates can thereby be very easily installed in the cartridge. The subsequent replacement when the coating wears out is not a complicated process.

According to another feature of the invention, the coating contains zeolite. The inclusion of zeolite is intended to counter the problem encountered with many materials with high catalytic activity, caused by the fact that they are severly hygroscopic, and must be kept free of moisture during the manufacture and assembly of the catalyst plates, and during use in the gas cleaning reactor. The addition of zeolite acts as a drying agent and also, for example, as a catalyst in the denitrification process. It protects the catalyst plates against damaging moisture in the air during their tempering, storage, assembly and operation. The heating of the zeolite in the presence of any moisture which may be present in the air also produces favorable air conditions for the catalyst plate cartridges. The zeolites can be dried during current operation of the reactor.

A refinement of the invention proposes that the coating exhibit a porous fiber matrix, to bind the additive materials in granular or plate form in the coating. The fibers can also be felted through the metal wire mesh, and thereby serve as the static element to provide a good adherence of the coating to the metal wire mesh.

The coating preferably exhibits, as a binder, cellulose, starches, resins and/or other binders, which do not have an adverse effect on the operation of the additives, and maintain the required porosity and flexibility of the coating.

It is particularly advantageous if the coating is deposited on both sides of the metal wire mesh. The coating on both sides of the catalyst plate serves both as the sealing and fastening material, and thereby has a particularly good adherence to the metal wire mesh, since the coating layers are in contact with one another through the passages in the metal wire mesh. In addition, the coating, because of the vermiculite or a similar material it contains, helps to brace the mounting in the cartridge, producing a solid bond. Here, too, the bracing forces can be controlled by the amount of the vermiculite or similar material. In this case, the fibers can be felted through the metal wire mesh with particularly good results.

Coatings with a thickness of between approximately 0.5 mm and 2 mm are preferred.

The invention also relates to a process for the manufacture of a cartridge of the type described above. The metal wire mesh is thereby formed into the desired shape of the mounting and coated. The mountings manufactured in this manner are inserted in the frames. Then the catalyst plates are introduced into the groove-like recesses of the mountings, and the unit comprised of the frame, mountings and catalyst plates is tempered at a temperature of approximately 450° C. for approximately 10 to 24 hours. This not only imparts the necessary characteristics to the catalyst material, but the catalyst plates are also braced in the mountings by the expansion of the vermiculite or similar material. The mountings are braced in the cartridge in a similar fashion.

The metal wire mesh can be coated by immersion, brushing, spraying and similar application processes.

The objectives, features, advantages and possible applications of the present invention will be indicated in the following description of embodiments with reference to the attached drawings. All the features indicated in the description and/or depicted in the illustrations, individually or in any appropriate combination, are included in the object of the invention, regardless of their classification in the claims or how they are referenced.

To sum up, one aspect of the invention resides broadly in a frame structure for holding catalytic plates for catalytically reacting with at least one fluid passing thereby and for cleaning the fluid of at least one contaminant. The frame structure comprises at least two portions having a plurality of recesses forming grooves for receiving and for holding at least two edges of the catalytic plates when inserted therein and for disposing the catalytic plates one from the other for forming spaces thereinbetween for passing the fluid therethrough. The frame structure also comprises means for containing the frame structure and the catalytic plates. The recesses are formed by a substantially rigid structure associated with the frame structure, and have a coating thereon which expands when heated. The coating is disposed in the recesses between the rigid structure and the catalytic plates, whereby the catalytic plates are held firmly within the recesses of the frame structure at least after the coating has been heated with the catalytic plates disposed in the recesses.

Another embodiment of the invention resides broadly in a process for the manufacture of a frame structure for placement within a body, the frame structure for holding catalytic plates for catalytically reacting with at least one fluid passing therethrough and for cleaning the fluid of contaminants. The process comprises the steps of forming a frame with recesses forming grooves for holding catalytic plates on at least two sides of the catalytic plates and for disposing the catalytic plates one from the other to form spaces thereinbetween for passing the fluid therethrough, and covering at least a portion of the recesses with a coating for being disposed between the frame and the catalytic plates. The process further comprises the steps of inserting the frame into the body for holding the frame, inserting the catalytic plates into the coated portions of the recesses, and heating the body with the coated frame holding the catalytic plates within the recesses at a temperature of approximately 450° C. for approximately 10 to approximately 24 hours, whereby the catalytic plates are held firmly within the recesses of the frame structure.

DESCRIPTION OF THE PREFERRED EMBODIMENTS

Figure 1:
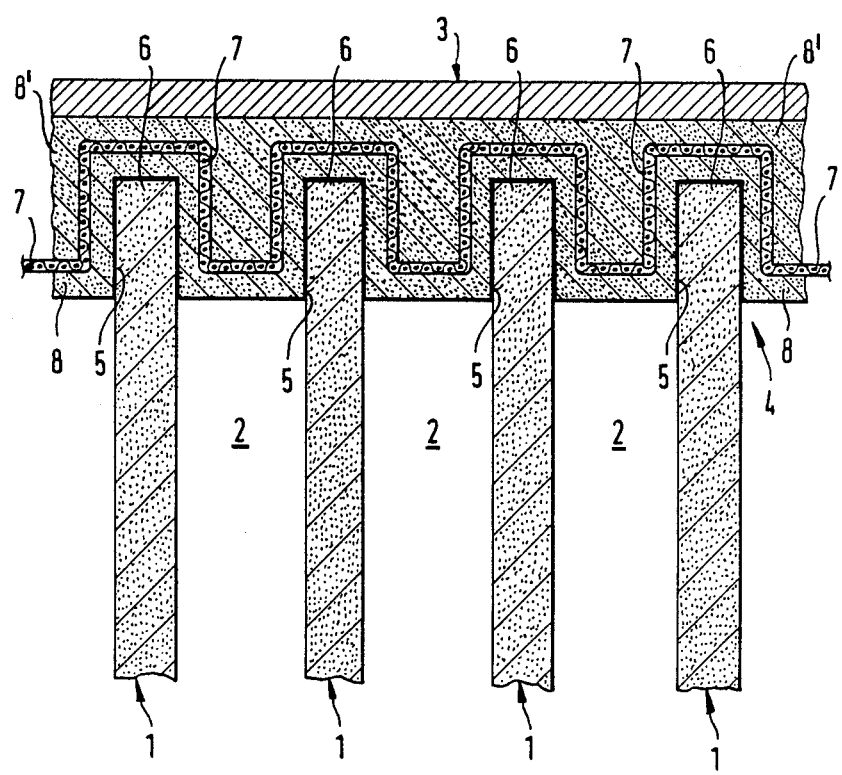
FIG. 1 shows, in cross section, a detail of a cartridge according to an embodiment of the invention.
Figure 2A:
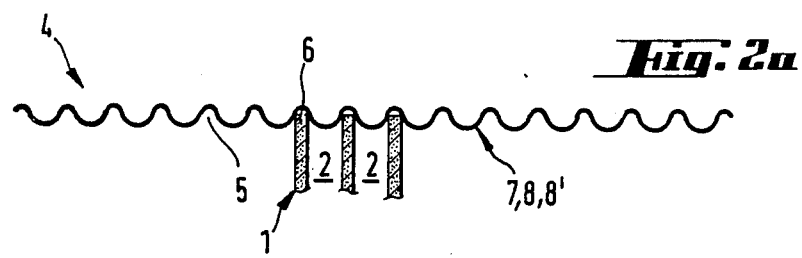
FIGS. 2a through 2d show, schematically, other embodiments of mountings which can be used in accordance with the invention.
Figure 2B:
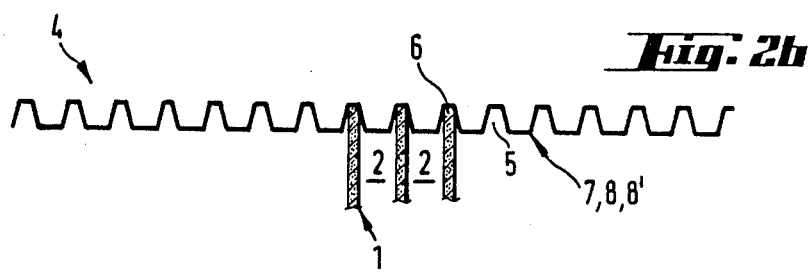
Figure 2C:
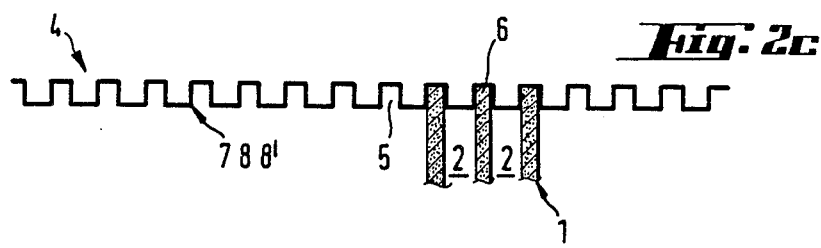
Figure 2D:
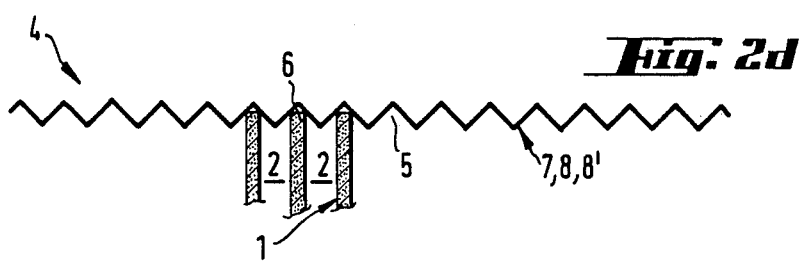

As shown in FIG. 1, a cartridge to hold catalyst plates 1, leaving open slot-shaped channels 2 for the passage of fluids to be cleaned catalytically, comprising an essentially cubic frame 3, of which only one side wall is shown in detail, and on two sides opposite one another, there are mountings 4 for the insertion of catalyst plates 1. The mountings 4 have groove-like recesses or guides 5 for this purpose, into which the catalyst plates 1 fit with their edges 6, and into which they can be inserted. The mountings 4 consist of a metal wire mesh 7 as the static element, which, as shown in the embodiment illustrated in FIG. 1, is covered on both sides with a coating 8. The coating 8 contains vermiculite, which expands at temperatures above approximately imately 200° C. The edges 6 of the catalyst plates 1 are thereby braced between the segments of the coating 8 forming recesses 5 with a rectangular cross section, on the appropriately-shaped metal wire mesh 7, and are thereby securely and flexibly held in place. Since, in the case illustrated in FIG. 1, the outer surface of the metal wire mesh 7 is also covered with the coating 8' containing vermiculite which, among other things, also fills up the recesses of the metal wire mesh 7 facing outward, and on the other side borders the side wall of the frame 3, the mounting 4 is itself braced in the frame 3 when the vermiculite expands.

The coatings 8 and 8' preferably also contain zeolite, to protect the hygroscopic catalyst plates 1 from the damaging effects of moisture in the air. The coatings 8 and 8' can also exhibit a porous fiber matrix to bind the granular or plate-shaped particles of the additives vermiculite and zeolite. Cellulose, starches and/or resins can be used as the binder for the coating 8. The coatings 8 and 8' preferably have a thickness between approximately 0.5 mm and 2 mm.

FIGS. 2a through 2d show various other forms of the metal wire mesh 7 with sufficient strength at high temperatures, and with various configurations of groove-like recesses 5 to hold the edge 6 of the plate 1. These configurations are corrugated in FIG. 2a, trapezoidal in FIG. 2b, rectangular in FIG. 2c and triangular in FIG. 2d.

A coating according to the invention, for example, may have a composition of 10% to 50% fibers (mineral, mineral wool, ceramic or glass fibers), 5% to 50% vermiculite, 5% to 50% zeolite, 1% to 10% methyl cellulose (starches or phenol resin), and the remainder, up to 50%, water.

Figure 3:
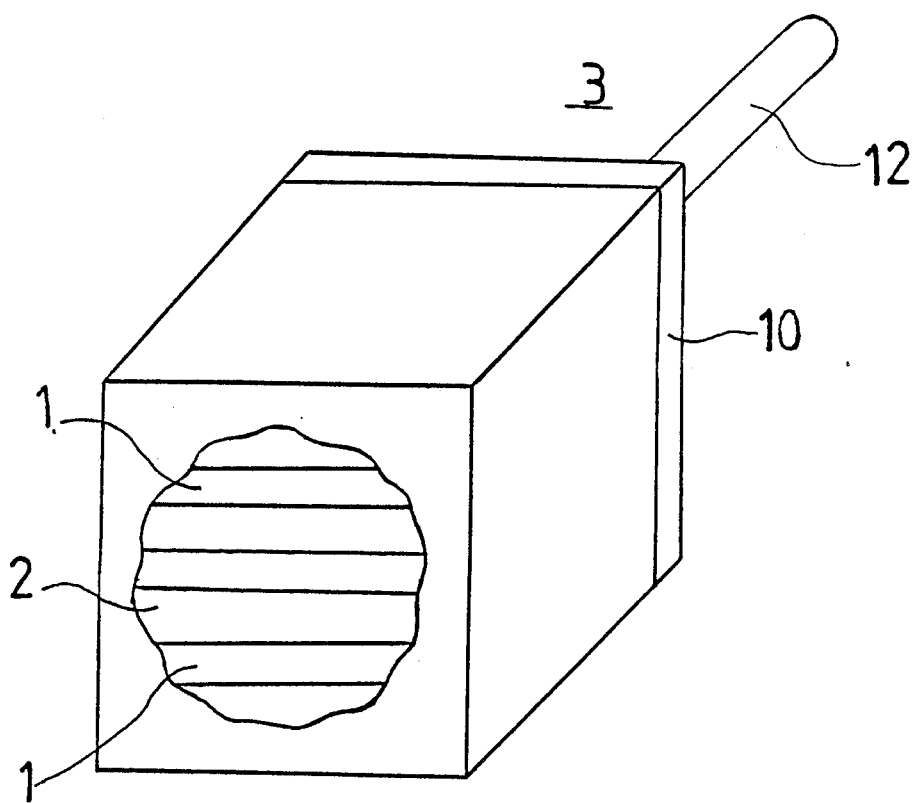
FIG. 3 shows a rectangular parallelepiped or essentially cubic frame for holding the catalyst plates.

FIG. 3 shows a rectangular parallelepiped or essentially cubic frame 3 for holding the catalyst plates 1. The structure of the wire mesh 7 and the coatings 8 and 8' are disposed within the frame 3 along the sides thereof, that is, the left side and the right side of the frame 3, as shown in FIG. 3. Although the frame 3 is shown with horizontal plates 1, these plates 1 could also be disposed vertically therein. Gas input and output arrangements, well known in the prior art, are only shown as a manifold 10 with a conduit 12 on the frame 3. A similar manifold is preferably disposed on the front side of the frame 3, as seen in FIG. 3 when only one unit is used. Otherwise, the individual frames 3, with the ends thereof open, can be stacked next to one another.

The process for the manufacture of a frame structure within a body, the frame structure for holding catalytic plates for catalytically reacting with at least one fluid passing therethrough and for cleaning the fluid of contaminants, comprises another embodiment of the invention and will now be described in some detail. The process comprises the steps of forming a frame with recesses for holding catalytic plates on at least two sides of the catalytic plates and for disposing the catalytic plates one from the other to form spaces thereinbetween for passing the fluid therethrough, and covering at least a portion of the recesses with a coating for being disposed between the frame and the catalytic plates. The process further comprises the steps of inserting the frame into the body for holding the frame, inserting the catalytic plates into the coated portions of the recesses, and heating the body with the coated frame holding the catalytic plates within the recesses at a temperature of approximately 450° C. for approximately 10 to approximately 24 hours.

The invention as described hereinabove in the context of the preferred embodiments is not to be taken as limited to all of the provided details thereof, since modifications and variations thereof may be made without departing from the spirit and scope of the invention.

What is claimed is:

1. In combination with a plurality of catalytic plates, a frame structure holding catalytic plates, said catalytic plates being made of a hygroscopic material for catalytically reacting with at least one fluid passing thereby and for cleaning the at least one fluid of at least one contaminant, said frame structure comprising:

at least two portions:

said at least two portions having a plurality of recesses forming grooves for receiving and for holding at least two edges of said catalytic plates in said frame structure and for disposing said catalytic plates substantially parallel one from the other forming spaces substantially parallel thereinbetween, said spaces being open at the ends thereof for passing the at least one fluid therethrough substantially parallel to said catalytic plates;

said recesses being formed by a substantially rigid structure positioned in each of said at least two portions, said recesses having a coating thereon which expands when heated, whereby said catalytic plates are held firmly within said recesses of said frame structure; and said coating comprising zeolite so as to absorb moisture from air to protect said hygroscopic plates.

2. The frame structure holding catalytic plates according to claim 1, wherein said coating additionally comprises vermiculite.

3. The frame structure holding catalytic plates according to claim 1, wherein said coating is between about 0.5 mm and about 2 mm thick.

4. The frame structure holding catalytic plates according to claim 1, wherein said recesses comprise substantially straight grooves.

5. The frame structure holding catalytic plates according to claim 1, wherein said grooves are disposed so as to hold two opposite edges of said catalytic plates.

6. The frame structure holding catalytic plates according to claim 1, wherein said rigid structure comprises metal wire mesh.

7. The frame structure holding catalytic plates according to claim 6, wherein said coating is deposited on both sides of said metal wire mesh.

8. The frame structure holding catalytic plates according to claim 1, wherein said coating additionally comprises porous fiber matrix.

9. The frame structure holding catalytic plates according to claim 8, wherein said rigid structure comprises metal wire mesh.

10. The frame structure holding catalytic plates according to claim 1, additionally comprising a parallelpiped shaped outer body for containing said frame structure with said catalytic plates therein.

11. The frame structure holding catalytic plates according to claim 10, additionally comprising means for stacking said frame structure on an additional frame structure, one adjacent the other, so as to form a cartridge.

12. The frame structure holding catalytic plates according to claim 1, wherein said coating additionally comprises a binder.

13. The frame structure holding catalytic plates according to claim 12, wherein said rigid structure comprises metal wire mesh.

14. The frame structure holding catalytic plates according to claim 12, wherein said binder is chosen from the group consisting essentially of cellulose, starches, resins, and combinations thereof.

* * * * *